United States Patent
Shen et al.

(10) Patent No.: US 10,605,605 B2
(45) Date of Patent: Mar. 31, 2020

(54) METHOD OF DETERMINING GNSS-INS VEHICLE ATTITUDE BASED ON SINGLE ANTENNA

(71) Applicant: SHANGHAI HUACE NAVIGATION TECHNOLOGY LTD, Shanghai (CN)

(72) Inventors: Xuefeng Shen, Shanghai (CN); Xianghui Che, Shanghai (CN); Qiang Ren, Shanghai (CN); Guangjie Cao, Shanghai (CN); Guangyang Dong, Shanghai (CN); Rui Tu, Shanghai (CN)

(73) Assignee: SHANGHAI HUACE NAVIGATION TECHNOLOGY LTD., Shanghai (CN)

(*) Notice: Subject to any disclaimer, the term of this patent is extended or adjusted under 35 U.S.C. 154(b) by 134 days.

(21) Appl. No.: 15/547,062

(22) PCT Filed: Jul. 4, 2016

(86) PCT No.: PCT/CN2016/088345
§ 371 (c)(1),
(2) Date: Jul. 27, 2017

(87) PCT Pub. No.: WO2017/107434
PCT Pub. Date: Jun. 29, 2017

(65) Prior Publication Data
US 2018/0017390 A1    Jan. 18, 2018

(30) Foreign Application Priority Data
Dec. 21, 2015    (CN) .......................... 2015 1 0969458

(51) Int. Cl.
*G01C 21/14*    (2006.01)
*G01C 21/16*    (2006.01)
(Continued)

(52) U.S. Cl.
CPC ............ *G01C 21/165* (2013.01); *G01S 19/42* (2013.01); *G01S 19/52* (2013.01); *G01C 21/16* (2013.01); *G01S 19/47* (2013.01); *G01S 19/49* (2013.01)

(58) Field of Classification Search
CPC ....... G01C 21/16; G01C 21/165; G01S 19/42; G01S 19/47; G01S 19/52
(Continued)

(56) References Cited

U.S. PATENT DOCUMENTS 6,883,747 B2 * 4/2005 Ratkovic ................. F41G 7/346
                                                    244/3.1
7,400,956 B1 * 7/2008 Feller ..................... A01B 69/008
                                                   342/357.36
(Continued)

FOREIGN PATENT DOCUMENTS

| CN | 102223707 A | 10/2011 |
| CN | 102890278 A | 1/2013 |

(Continued)

OTHER PUBLICATIONS

Attitude determination of spinning objects; Alexander E. Goncharov; Igor N. Kartsan; Dmitry D. Dmitriev; Valery N. Tyapkin; Yuri L. Fateev; 2016 International Siberian Conference on Control and Communications (SIBCON); pp. 1-5; IEEE Conferences; Year 2016.*

(Continued)

*Primary Examiner* — Cuong H Nguyen
(74) *Attorney, Agent, or Firm* — Gokalp Bayramoglu

(57) ABSTRACT

The present invention discloses a GNSS-INS vehicle attitude determination method based on a single antenna, including the steps as below: mounting a GNSS antenna at a centroid and in the center of the vehicle, and mounting the IMU measuring unit of the MEMS sensor on the steering (Continued)

shaft of the vehicle; obtaining the position and velocity information of the vehicle by means of the GNSS antenna, obtaining the heading angular speed information of the vehicle by means of the IMU measuring unit; calculating the attitude angle of the vehicle by means of the combination with accelerometer and gyroscope; calculating the heading angle of the vehicle based on the position, velocity, and heading angular speed of the vehicle. The method combines the advantages of the short-term high precision of the IMU gyroscope and the long-term high stability of the GNSS single antenna, so as to avoid the divergence phenomenon.

12 Claims, 2 Drawing Sheets

(51) Int. Cl.
*G01S 19/42* (2010.01)
*G01S 19/52* (2010.01)
*G01S 19/47* (2010.01)
*G01S 19/49* (2010.01)

(58) Field of Classification Search
USPC .............. 701/469, 500, 504, 507; 702/142
See application file for complete search history.

(56) References Cited

U.S. PATENT DOCUMENTS

| | | | | |
|---|---|---|---|---|
| 7,885,745 B2* | 2/2011 | McClure | ............. | G01C 21/005 701/408 |
| 8,131,462 B2 | 3/2012 | Roberts et al. | | |
| 8,140,223 B2* | 3/2012 | Whitehead | ........... | A01B 79/005 701/41 |
| 8,265,826 B2* | 9/2012 | Feller | .................. | A01B 69/007 701/41 |
| 8,583,315 B2* | 11/2013 | Whitehead | ........... | A01B 69/007 701/31.4 |
| 8,756,001 B2* | 6/2014 | Georgy | ................ | G01C 21/165 340/995.28 |
| 9,880,562 B2* | 1/2018 | Webber | ............. | A01B 69/007 |
| 9,886,038 B2* | 2/2018 | Webber | ............. | A01B 69/007 |
| 2003/0135327 A1* | 7/2003 | Levine | ................. | G01C 21/165 701/500 |
| 2004/0188561 A1* | 9/2004 | Ratkovic | ................ | F41G 7/346 244/3.15 |
| 2011/0297070 A1* | 12/2011 | Riggs | ...................... | B63G 8/16 114/330 |
| 2012/0221244 A1* | 8/2012 | Georgy | ................ | G01C 21/165 701/472 |
| 2013/0127658 A1 | 5/2013 | McFarland et al. | | |
| 2016/0334804 A1* | 11/2016 | Webber | ................. | E02F 9/2045 |
| 2018/0120111 A1* | 5/2018 | Petillon | .................. | B64D 43/02 |

FOREIGN PATENT DOCUMENTS

| | | | | |
|---|---|---|---|---|
| CN | 103033836 A | | 4/2013 | |
| CN | 103235328 A | | 8/2013 | |
| CN | 104698485 A | | 6/2015 | |
| EP | 003396316 A1 | * | 10/2018 | ............ G01S 19/49 |
| KR | 20170109646 A | * | 9/2017 | ............ G01S 19/42 |
| RU | 002662462 C1 | * | 7/2018 | ............ G01C 21/16 |

OTHER PUBLICATIONS

An iterative method for attitude determination based on misaligned GNSS baselines; Alireza A. Ardalan et al.; IEEE Transactions on Aerospace and Electronic Systems; pp. 97-107; IEEE Journals & Magazines; year 2015.*

Airborne antenna tracking for Sky-Net mobile communication; Chin E. Lin; Ying-Chi Huang; Ya-Hsien Lai; Yung-Lan Yeh; Wei-Chi Huang; 2011 Fifth International Conference on Sensing Technology; pp. 569-574; IEEE Conferences; year 2011.*

Applying a three-antenna GPS and suspension displacement sensors to a road vehicle; Ling-Yuan Hsu; Tsung-Lin Chen; Sensors, 2009 IEEE; pp. 1593-1597; year 2009.*

* cited by examiner

METHOD OF DETERMINING GNSS-INS VEHICLE ATTITUDE BASED ON SINGLE ANTENNA

CROSS REFERENCE TO RELATED APPLICATIONS

This application is the national phase entry of International Application No. PCT/CN2016/088345, filed on Jul. 4, 2016, which is based upon and claims priority to Chinese Patent Application No. 201510969458.2 (CN), filed on Dec. 21, 2015, the entire contents of which are incorporated herein by reference.

TECHNICAL FIELD

The present invention relates to an agricultural vehicle automation filed, particularly relating to a method of determining GNSS-INS vehicle attitude based on a single antenna.

BACKGROUND

With the development of the modern technology and advancements in biotechnology, GNSS technology, and information technology we see a wide application of modern technology in agriculture, leading to the emergence of precision agriculture. As a core carrier of the precision agriculture, the agricultural machinery automatic driving system is significant for various agricultural tasks including farming, sowing, fertilization, irrigation, vegetation protection, harvesting, etc.

In order to improve the accuracy of the agricultural vehicle automatic driving system, it is necessary to measure the navigation accuracies of agricultural vehicle co-ordinates, the heading angle and the attitude angle, therefore the measurement values should be as accurate as possible. In particular, when the agricultural vehicles equipped with GNSS receivers are moving in the fields, the GNSS receiving antenna is tilted due to the vibrations of the vehicle body resulting from an uneven force exerted on the tires from the soil. As a result, the GNSS antenna does not coincide with the centroid of the vehicle body, so accurate attitude angles and heading angles of the vehicle body are necessary.

At present, the method of measuring GNSS attitudes with multiple antennas is often used. However, this method has the disadvantages of high cost, delay of antenna reception, poor real-time performance and difficulty in installation. As to the inertial navigation INS used in the land navigation system for attitude determination, because of high cost etc., it is not applicable to the attitude determination of the agricultural vehicle.

SUMMARY OF THE INVENTION

In view of the above-mentioned deficiencies in the field of agricultural vehicle automation, the present invention provides a GNSS-INS vehicle attitude determination method based on a single antenna, which can realize the attitude determination of the vehicle through a single antenna and improve the accuracy of the attitude determination.

In order to achieve the above objective, an embodiment of the present invention employs technical solutions as below:

A GNSS-INS vehicle attitude determination method based on a single antenna, wherein the GNSS-INS vehicle attitude determination method based on a single antenna includes steps as below:

mounting a GNSS antenna at a centroid and in a center of a vehicle, and mounting an IMU measuring unit of a MEMS sensor on a steering shaft of the vehicle;

obtaining a position and a velocity of the vehicle by means of the GNSS antenna, obtaining a heading angular speed of the vehicle by means of the IMU measuring unit;

calculating an attitude angle of the vehicle by means of a combination of an accelerometer and a gyroscope;

calculating a heading angle of the vehicle based on the position, the velocity, and the heading angular speed of the vehicle.

According to one aspect of the present invention, when the IMU measuring unit of the MEMS sensor is fixed on the steering shaft of the vehicle, three axis coordinates of the IUM measuring unit are consistent with three axis coordinates of the vehicle.

According to one aspect of the present invention, the step of calculating the attitude angle of the vehicle by means of the combination of the accelerometer and the gyroscope comprises:

when a condition that the vehicle is stationary or in a uniform motion, an acceleration of the vehicle is zero, and a rolling angle and a pitch angle of the vehicle are accurately obtained based on a principle of the accelerometer:

$$\theta = \sin^{-1}(a_x)$$
$$\phi = \sin^{-1}\left(\frac{a_y}{\cos\theta}\right),$$

wherein $a_x$, $a_y$ are accelerations of X axis and Y axis of a carrier coordinate system; $\theta$ is the pitch angle; and $\emptyset$ is the rolling angle;

when the vehicle is running quickly or vibrating seriously, the gyroscope is introduced to calculate the attitude angle by means of the combination of the accelerometer and the gyroscope, and the specific steps are as below:

creating a combination filter of the rolling angle and the pitch angle first, the combination filter is specifically as below:

$$\begin{cases} \dot{x}(t) = A(t)x(t) + w(t) \\ z(t) = f(x(t)) + v(t) \end{cases},$$

wherein parameters to be estimated are shown as below:

$$x(t) = [\theta \phi \omega_x \omega_y \omega_z]^T,$$

an observation vector is as below:

$$z(t) = [{}^b f_x {}^b f_y {}^b \omega_{ibx} {}^b \omega_{iby} {}^b \omega_{ibz}]^T,$$

wherein ${}^b f_{x,y}$ and ${}^b \omega_{ibx,y,z}$ are respective outputs of the accelerometer and the gyroscope;

a state transition matrix is as below:

$$A(t) = \begin{bmatrix} 0 & 0 & 0 & \cos\phi & -\sin\phi \\ 0 & 0 & 1 & \sin\phi(t)\tan\theta(t) & \cos\phi(t)\tan\theta(t) \\ 0 & 0 & 0 & 0 & 0 \\ 0 & 0 & 0 & 0 & 0 \\ 0 & 0 & 0 & 0 & 0 \end{bmatrix},$$

an observation design matrix is as below:

$$f(x(t)) = [\sin\theta \cos\phi \omega_x \omega_y \omega_z]^T,$$

calculating and obtaining the rolling angle and the pitch angle of the vehicle based on above parameters.

According to one aspect of the present invention, the step of calculating the attitude angle of the vehicle by means of the combination of the accelerometer and the gyroscope comprises:

when the vehicle is stationary or in a uniform motion, an acceleration of the vehicle is zero, and the rolling angle and the pitch angle of the vehicle are accurately obtained based on a principle of the accelerometer:

$$\theta = \sin^{-1}(a_x)$$
$$\phi = \sin^{-1}\left(\frac{a_y}{\cos\theta}\right),$$

wherein $a_x$, $a_y$ are accelerations of X axis and Y axis of a carrier coordinate system: $\theta$ is the pitch angle; $\phi$ is the rolling angle;

when the vehicle is running quickly or vibrating seriously, the gyroscope is introduced to calculate the attitude angle by means of the combination of the accelerometer and the gyroscope, and the specific steps are as below:

since a tilt angle (the rolling angle or the pitch angle) and a tilt angular velocity have a derivative relation, a real tilt angle $\varphi$ of the system is used as a state vector, a constant deviation b of the gyroscope is estimated by the accelerometer, and the deviation b is used as another state vector to obtain a state equation and an observation equation:

$$\begin{bmatrix}\dot{\varphi}\\\dot{b}\end{bmatrix} = \begin{bmatrix}0 & -1\\0 & 0\end{bmatrix}\begin{bmatrix}\varphi\\b\end{bmatrix} + \begin{bmatrix}1\\0\end{bmatrix}\omega_{gyro} + \begin{bmatrix}w_g\\0\end{bmatrix}$$

$$\varphi_{acce} = \begin{bmatrix}1 & 0\end{bmatrix}\begin{bmatrix}\varphi\\b\end{bmatrix} + w_a$$

wherein $\omega_{gyro}$ is an angular velocity output by the gyroscope, wherein the angular velocity includes a fixed deviation, $\varphi_{acce}$ is an angle value processed by the accelerometer, $W_g$ is a noise of a measured value from the gyroscope, $W_a$ is a noise of a measured value from the accelerometer, b is a drift error of the gyroscope, $W_g$ and $W_a$ are independent from each other, and are both assumed to be white noises that satisfy a normal distribution; setting a covariance matrix Q of a system process noise of the Kalman filter and a covariance matrix R of a measurement error, formulas of the covariance matrix Q and the covariance matrix R are as below:

$$Q = \begin{bmatrix}q\_acce & 0\\0 & q\_gyro\end{bmatrix}$$
$$R = [r\_acce]$$

wherein q_acce and q_gyro are respective covariance of the accelerometer and the gyroscope; r_acce is a noise of a measured value from the accelerometer;

calculating and obtaining the rolling angle and the pitch angle of the vehicle based on above parameters.

According to one aspect of the present invention, the step of calculating the heading angle of the vehicle based on the position, the velocity, and the heading angular speed of the vehicle comprises:

obtaining the heading angle by calculating an eastward velocity and a northward velocity, a formula of obtaining the heading angle is $$\psi_p = \arctan(v_E/v_N),$$

wherein $\psi_p$ is the heading angle of the GNSS, $v_E$, $v_N$ are respectively the eastward velocity and the northward velocity;

when the vehicle is stationary or moves at a very low speed, the combination of a Z axis gyroscope and the GNSS are introduced to calculate the heading angle accurately, and a system equation and an observation equation are as below:

$$\begin{bmatrix}\dot{\psi}_{vel}\\\dot{b}_r\end{bmatrix} = \begin{bmatrix}0 & -1\\0 & -1/T_b\end{bmatrix}\begin{bmatrix}\psi_{vel}\\b_r\end{bmatrix} + \begin{bmatrix}1\\0\end{bmatrix}g_r + \begin{bmatrix}1 & 0\\0 & -1/T_b\end{bmatrix}w_{hd}$$

$$\psi_{GNSS} = \begin{bmatrix}1 & 0\end{bmatrix}\begin{bmatrix}\psi_{vel}\\g_{bias}\end{bmatrix} + v_{\psi}$$

wherein, $\psi_{GNSS}$ is the heading angle output by the GNSS, $b_r$ is a drift error of the gyroscope, $W_{hd}$ is a noise of a heading process, $T_b$ is first-order Markov correlation time;

formulas after linearization are as below:

$$\begin{bmatrix}\psi\\b_r\end{bmatrix}_{k+1} = \begin{bmatrix}1 & -T_s\\0 & 1\end{bmatrix}\begin{bmatrix}\hat{\psi}\\\hat{b}_r\end{bmatrix}_k + \begin{bmatrix}T_s\\0\end{bmatrix}[r_m]_k$$

$$[v]_k = H_{yaw}\begin{bmatrix}\hat{\psi}\\\hat{b}_r\end{bmatrix}_k$$

when the vehicle is moving, $H_{yaw}=[1\ 0]$, otherwise $H_{yaw}=[0\ 0]$.

According to one aspect of the present invention, the MEMS sensor is a six-axis MEMS sensor.

The advantages of implementing the present invention are provided: A GNSS-INS vehicle attitude determination method based on a single antenna of the present invention, including the steps as below: mounting the GNSS antenna at the centroid and in the center of the vehicle, and mounting the IMU measuring unit of the MEMS sensor on the steering shaft of the vehicle; obtaining the position and velocity information of the vehicle by means of the GNSS antenna, obtaining the heading angular speed information of the vehicle by means of the IMU measuring unit; calculating the attitude angle of the vehicle by means of a combination of an accelerometer and a gyroscope; calculating the heading angle of the vehicle according to the position, velocity, and heading angular speed of the vehicle. By means of a combination of the single antenna GNSS and a low cost IMU/MEMS sensor, the attitude and the position can be determined based on the kinematics model of the agricultural vehicle. The method combines the advantages of the short-term high precision of the IMU gyroscope and the long-term high stability of the GNSS single antenna, so as to avoid the divergence phenomenon which occurs when using gyroscope and reduce the noise level of the GNSS attitude determination. Hence, the accuracy of the attitude determination can be increased several times.

DETAILED DESCRIPTION OF THE EMBODIMENTS

The technical solutions in the embodiments of the present invention will be clearly and fully described with reference to the accompanying drawings in the embodiments of the present invention. Obviously, the described embodiments are merely certain embodiments of the invention and are not intended to be exhaustive. Based on embodiments in the present invention, other embodiments obtained by the ordinary person skilled in the art without creative work all fall within the scope of the present invention.

Embodiment 1

Figure 1:
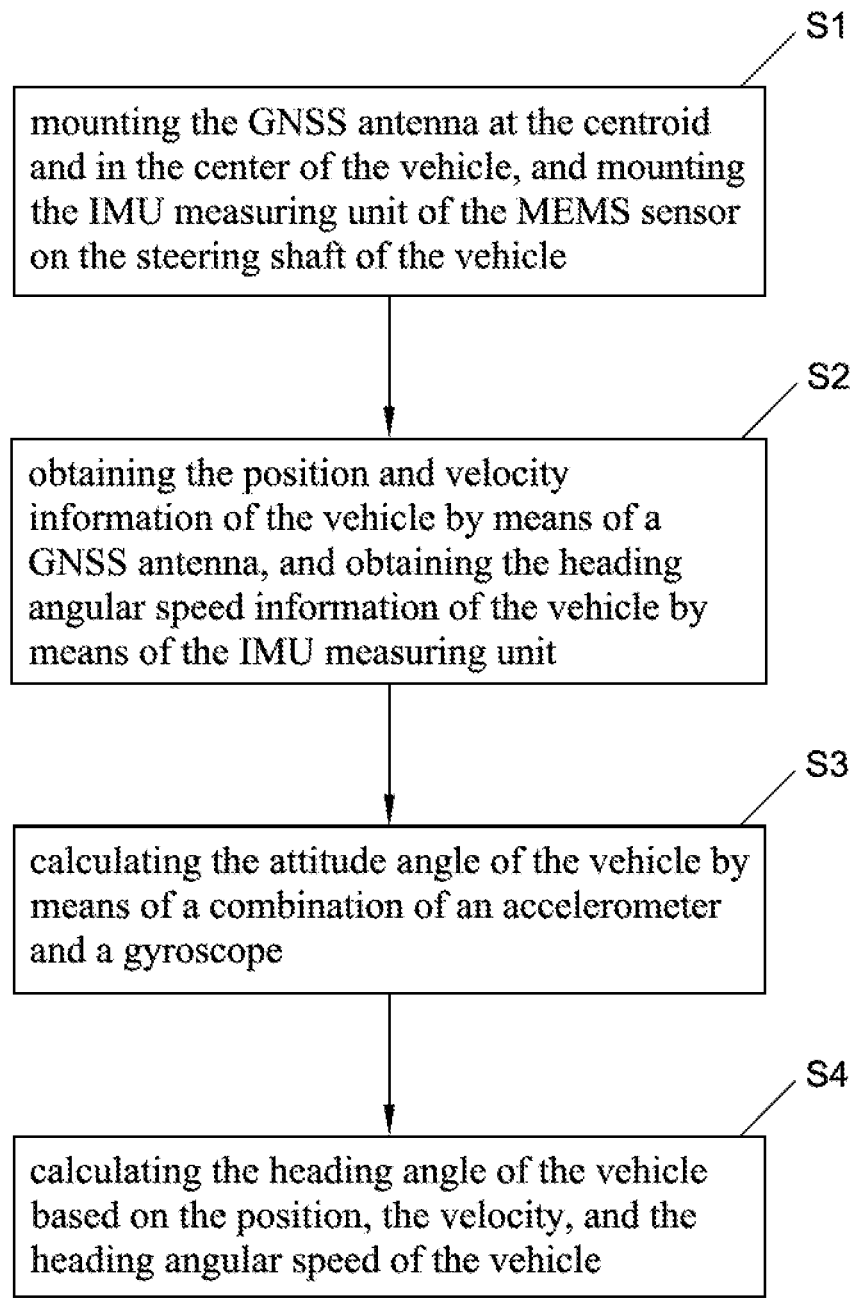
FIG. 1 is a flow chart showing a method of determining GNSS-INS vehicle attitude based on a single antenna of the present invention.
Figure 2:
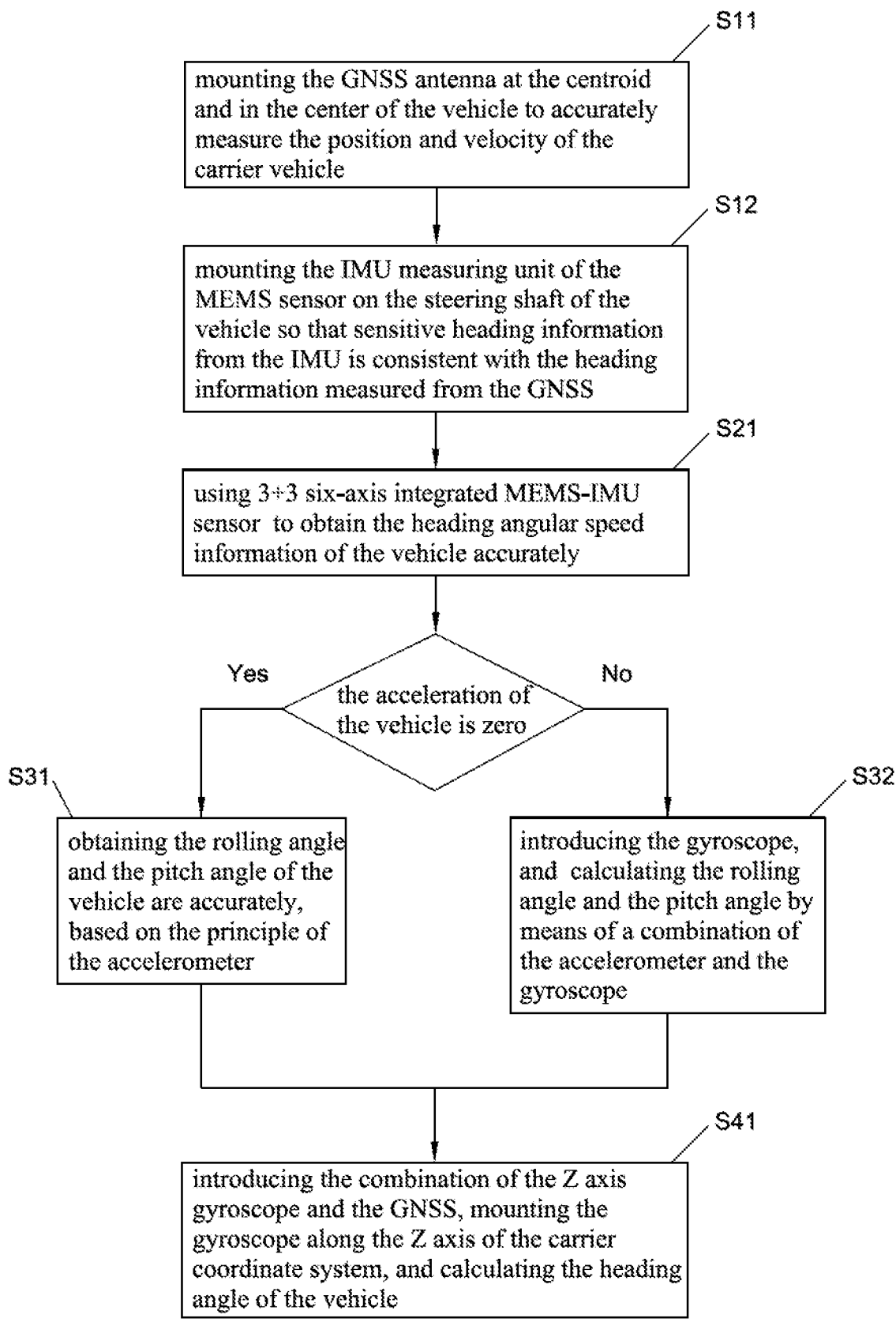
FIG. 2 is a flow chart of an embodiment according to the present invention.

As shown in FIG. 1 and FIG. 2, a GNSS-INS vehicle attitude determination method based on a single antenna, wherein the GNSS-INS vehicle attitude determination method based on a single antenna includes steps as below:

Step S1: mounting the GNSS antenna at the centroid and in the center of the vehicle, and mounting the IMU measuring unit of the MEMS sensor on the steering shaft of the vehicle.

In the step S1, the specific implementation of mounting the GNSS antenna at the centroid and in the center of the vehicle, and mounting the IMU measuring unit of the MEMS sensor on the steering shaft of the vehicle is as below: Step S11: The GNSS antenna is mounted at the centroid and in the center of the vehicle to accurately measure the position and velocity of the carrier vehicle. When the IMU measuring unit of the MEMS sensor is fixed on the carrier vehicle, the three-axis coordinates of the IMU measuring unit are consistent with the three-axis coordinates of the vehicle. At the same time, the IMU measuring unit should be steered in real-time when the wheel of the vehicle is steered. That is to say, Step S12: the IMU measuring unit is mounted on the shaft of the vehicle, to make the IMU measuring unit precisely sensitive to the heading angular speed of the vehicle, so that sensitive heading information from the IMU is consistent with the heading information measured from the GNSS.

Step S2: obtaining the position and velocity information of the vehicle by means of a GNSS antenna, and obtaining the heading angular speed information of the vehicle by means of the IMU measuring unit.

In the step S2, the position and velocity information of the vehicle are obtained by means of the GNSS antenna, and the heading angular speed information of the vehicle is obtained by means of the IMU measuring unit. Step S21: 3+3 six-axis integrated MEMS-IMU sensor is used to obtain the heading angular rate information of the vehicle accurately.

Step S3: calculating the attitude angle of the vehicle by means of a combination of an accelerometer and a gyroscope.

In the step S3, the attitude angle of the vehicle by means of a combination of the accelerometer and the gyroscope is calculated and specifically includes the following steps:

Since the measurement accuracy of the gyroscope of the MEMS-IMU is not sensitive to the rotational angular speed of the Earth, so the MEMS system cannot be fully self-aligned. When the vehicle is stationary or in a uniform motion, the acceleration of the vehicle is zero, and Step S31: the rolling angle and the pitch angle of the vehicle are accurately obtained based on the principle of the accelerometer:

$$\theta = \sin^{-1}(a_x)$$
$$\phi = \sin^{-1}\left(\frac{a_y}{\cos\theta}\right).$$

In the formulas, $a_x$, $a_y$ are referred to as the accelerations of the x axis and the y axis of the carrier coordinate system; $\theta$ is referred to as the pitch angle; and $\emptyset$ is referred to as the rolling angle.

When the vehicle is running quickly or vibrating seriously, because of the influences of the accelerations from other directions, the attitude angel cannot be calculated using the above formulas. Step S32: The gyroscope is thus introduced to perform calculations by means of a combination of the accelerometer and the gyroscope, and the specific steps are as below:

Creating a combination filter of the rolling angle and the pitch angle first, the combination filter is specifically as below:

$$\begin{cases} \dot{x}(t) = A(t)x(t) + w(t) \\ z(t) = f(x(t)) + v(t) \end{cases}.$$

Wherein the parameters to be estimated is as below:

$$x(t) = [\theta \phi \omega_x \omega_y \omega_z]^T.$$

The observation vector is as below:

$$z(t) = [{}^b f_x {}^b f_y {}^b \omega_{ibx} {}^b \omega_{iby} {}^b \omega_{ibz}]^T.$$

Wherein ${}^b f_{x,y}$ and ${}^b \omega_{ibx,y,z}$ are respective outputs of the accelerometer and the gyroscope.

The state transition matrix is as below:

$$A(t) = \begin{bmatrix} 0 & 0 & 0 & \cos\phi & -\sin\phi \\ 0 & 0 & 1 & \sin\phi(t)\tan\theta(t) & \cos\phi(t)\tan\theta(t) \\ 0 & 0 & 0 & 0 & 0 \\ 0 & 0 & 0 & 0 & 0 \\ 0 & 0 & 0 & 0 & 0 \end{bmatrix}.$$

The observation design matrix is as below:

$$f(x(t)) = [\sin\theta \ \cos\phi \omega_x \omega_y \omega z]^T.$$

Calculating and obtaining the rolling angle and the pitch angle of the vehicle based on the above parameters.

Step S4: calculating the heading angle of the vehicle based on the position, the velocity, and the heading angular speed of the vehicle.

In the step S4, the heading angle of the vehicle is calculated based on the position, the velocity and the heading angular speed of the vehicle, and specifically includes:

The GNSS attitude determination by the single antenna mainly uses the GNSS velocity, and the heading angle of vehicle is obtained by calculating the eastward velocity and the northward velocity, specifically:

$$\psi_p = \arctan(v_E/v_N)$$

In the formula, $\psi_p$ is referred to as the heading angle of the GNSS, $v_E$, $v_N$ are respectively the eastward velocity and the northward velocity.

In practical applications, the GNSS heading angle can be extracted directly from the NMEA sentences output from the GNSS receiver. However, when the vehicle is stationary or moves at a very low speed, the numerical values are unstable mathematically, and the velocity measurement errors may overwhelm the real velocity values.

In order to improve the heading accuracy, Step S41: the combination of the Z axis gyroscope and the GNSS are introduced. The gyroscope is mounted along the Z axis of the carrier coordinate system. The system equation and the observation equation are as below:

$$\begin{bmatrix} \dot{\psi}_{vel} \\ b_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

$$\psi_{GNSS} = \begin{bmatrix} 1 & 0 \end{bmatrix} \begin{bmatrix} \psi_{vel} \\ g_{bias} \end{bmatrix} + v_{\psi}.$$

In the formulas, $\psi_{GNSS}$ is referred to as the heading angle output by the GNSS, $b_r$ is referred to as the drift error of the gyroscope, $W_{hd}$ is referred to as the noise of the heading process, $T_b$ is referred to as the first-order Markov correlation time.

The formulas after linearization are showed as below:

$$\begin{bmatrix} \psi \\ b_r \end{bmatrix}_{k+1} = \begin{bmatrix} 1 & -Ts \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k.$$

When the vehicle is moving, $H_{yaw}=[0\ 1]$, otherwise $H_{yaw}=[0\ 0]$.

Finally, the attitude determination of GNSS-INS vehicle based on a single antenna is realized by calculating the attitude angle of the vehicle and the heading angle.

A GNSS-INS vehicle attitude determination method based on a single antenna of the present invention, includes the steps as below: mounting the GNSS antenna at the centroid and in the center of the vehicle, and mounting the IMU measuring unit of the MEMS sensor on the steering shaft of the vehicle; obtaining the position and velocity information of the vehicle by means of the GNSS antenna, and obtaining the heading angular speed information of the vehicle by means of the IMU measuring unit; calculating the attitude angle of the vehicle by means of a combination of accelerometer and gyroscope; calculating the heading angle of the vehicle based on the position, velocity, and heading angular speed of the vehicle. By means of a combination of the single antenna GNSS and the IMU/MEMS sensor with a low cost, the attitude and direction are determined based on the kinematics model of the agricultural vehicle. The method combines the advantages of the short-term high precision of the IMU gyroscope and the long-term high stability of the GNSS single antenna, so as to avoid the divergence phenomenon which occurs when using the gyroscope and reduce the noise level of the GNSS attitude determination. Hence, the accuracy of the attitude determination can be increased several times. An IMU sensor is used in the attitude determination method described in the present embodiment, the heading angle error is less than 0.2°, and the pitch angle error and rolling angle error are less than 0.08°. In practical applications, 3+3 six-axis integrated IMU sensor is used. The 3+3 six-axis integrated IMU sensor has a small size and light weight, and is cost-effective and modularly designed, and thus it can be integrated easily into the agricultural machinery auxiliary driving control system.

In practical applications, a tilt sensor can also be used to replace the IMU sensor to achieve the attitude determination solution.

Embodiment 2

As shown in FIG. 1 and FIG. 2, a GNSS-INS vehicle attitude determination method based on a single antenna, wherein the GNSS-INS vehicle attitude determination method based on a single antenna includes steps as below:

Step S1: mounting the GNSS antenna at the centroid and in the center of the vehicle, and mounting the IMU measuring unit of the MEMS sensor on the steering shaft of the vehicle.

In the step S1, the specific implementation of mounting the GNSS antenna at the centroid and in the center of the vehicle, and mounting the IMU measuring unit of the MEMS sensor on the steering shaft of the vehicle is as below: Step S11: The GNSS antenna is amounted at the centroid and in the center of the vehicle to accurately measure the position and velocity of the carrier vehicle. When the IMU measuring unit of the MEMS sensor is fixed on the carrier vehicle, the three-axis coordinates of the IMU measuring unit are consistent with the three-axis coordinates of the vehicle.

At the same time, the IMU measuring unit should be steered in real-time when the wheel of the vehicle is steered. That is to say, Step S12: the IMU measuring unit is mounted on the shaft of the vehicle, to make the IMU measuring unit precisely sensitive to the heading angular speed of the vehicle, so that sensitive heading information from the IMU is consistent with the heading information measured from the GNSS.

Step S2: obtaining the position and velocity information of the vehicle by means of a GNSS antenna, and obtaining the heading angular speed information of the vehicle by means of the IMU measuring unit.

In the step S2, the position and velocity information of the vehicle are obtained by means of the GNSS antenna, and the heading angular speed information of the vehicle is obtained by means of the IMU measuring unit. Step S21: 3+3 six-axis integrated MEMS-IMU sensor is used to obtain the heading angular speed information of the vehicle accurately.

Step S3: calculating the attitude angle of the vehicle by means of a combination of an accelerometer and a gyroscope.

In the step S3, the attitude angle of the vehicle by means of a combination of the accelerometer and the gyroscope is calculated and specifically includes the following steps:

Since the measurement accuracy of the gyroscope of the MEMS-IMU is not sensitive to the rotational angular velocity of the Earth, so the MEMS system cannot be fully self-aligned. When the vehicle is stationary or in a uniform motion, the acceleration of the vehicle is zero, and Step S31: the rolling angle and the pitch angle of the vehicle are accurately obtained based on the principle of the accelerometer:

$$\theta = \sin^{-1}(a_x)$$

$$\phi = \sin^{-1}\left(\frac{a_y}{\cos\theta}\right)$$

In the formulas, $a_x$, $a_y$ are referred to as the accelerations of the x axis and the y axis of the carrier coordinate system; $\theta$ is referred to as the pitch angle; and $\emptyset$ is referred to as the rolling angle.

When the vehicle is running quickly or vibrating seriously, because of the influences of the accelerations from other directions, the attitude angel cannot be calculated using the above formulas. Step S32: The gyroscope is thus introduced to perform calculations by means of a combination of the accelerometer and the gyroscope, and the specific steps are as below:

Since the tilt angle (the rolling angle or the pitch angle) and the tilt angular velocity have a derivative relation, the real tilt angle φ of the system can be used as a state vector. The constant deviation b of the gyroscope is estimated by the accelerometer, and the deviation b is used as another state vector to obtain the corresponding state equation and observation equation:

$$\begin{bmatrix} \dot{\varphi} \\ \dot{b} \end{bmatrix} = \begin{bmatrix} 0 & -1 \\ 0 & 0 \end{bmatrix} \begin{bmatrix} \varphi \\ b \end{bmatrix} + \begin{bmatrix} 1 \\ 0 \end{bmatrix} \omega_{gyro} + \begin{bmatrix} w_g \\ 0 \end{bmatrix}$$

$$\varphi_{acce} = \begin{bmatrix} 1 & 0 \end{bmatrix} \begin{bmatrix} \varphi \\ b \end{bmatrix} + w_a$$

In the formulas, $\omega_{gyro}$ acce is referred to as an angular velocity output by the gyroscope, wherein the angular velocity includes a fixed deviation, $\varphi_{acce}$ is referred to as the angle value processed by the accelerometer, $W_g$ is referred to as the noise of the measurement from the gyroscope, $W_a$ is referred to as the noise of the measurement from the accelerometer, b is referred to as the drift error of the gyroscope, $W_g$ and $W_a$ are independent from each other, and are both assumed to be white noise that satisfy the normal distribution. At the same time, the covariance matrix Q of the system process noise of the Kalman filter and the covariance matrix R of the measurement error are set, and the formulas are as below:

$$Q = \begin{bmatrix} q\_acce & 0 \\ 0 & q\_gyro \end{bmatrix}$$

$$R = [r\_acce]$$

In the formulas, the q_acce and q_gyro are the respective covariance of the accelerometer and the gyroscope: r_acce is the noise of the measurement from the accelerometer.

Calculating and obtaining the rolling angle and the pitch angle of the vehicle based on the above parameters.

Step S4: calculating the heading angle of the vehicle based on the position, the velocity, and the heading angular speed of the vehicle.

In the step S4, the heading angle of the vehicle is calculated based on the position, the velocity and the heading angular speed of the vehicle, and specifically includes:

The GNSS attitude determination by the single antenna mainly uses the GNSS velocity, and the heading angle of vehicle is obtained by calculating the eastward velocity and the northward velocity, specifically:

$$\psi_p = \arctan(v_E/v_N)$$

In the formula, $\psi_p$ is referred to as the heading angle of the GNSS, $v_E$, $v_N$ are respectively the eastward velocity and the northward velocity.

In practical applications, the GNSS heading angle can be extracted directly from the NMEA sentences output from the GNSS receiver. However, when the vehicle is stationary or moves at a very low speed, the numerical values are unstable mathematically, and the velocity measurement errors may overwhelm the real velocity values.

In order to improve the heading accuracy, Step S41: the combination of the Z axis gyroscope and the GNSS are introduced. The gyroscope is mounted along the Z axis of the carrier coordinate system. The system equation and the observation equation are as below:

$$\begin{bmatrix} \dot{\psi}_{vel} \\ \dot{b}_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

$$\psi_{GNSS} = \begin{bmatrix} 1 & 0 \end{bmatrix} \begin{bmatrix} \psi_{vel} \\ g_{bias} \end{bmatrix} + v_{\psi}$$

In the formulas, $\psi_{GNSS}$ is referred to as the heading angle output by the GNSS, $b_r$ is referred to as the drift error of the gyroscope, $W_{hd}$ is referred to as the noise of the heading process, $T_b$ is referred to as the first-order Markov correlation time.

The formulas after linearization are shown below:

$$\begin{bmatrix} \psi \\ b_r \end{bmatrix}_{k+1} = \begin{bmatrix} 1 & -T_s \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k$$

When the vehicle is moving, $H_{yaw} = [1\ 0]$, otherwise $H_{yaw} = [0\ 0]$.

Finally, the attitude determination of GNSS-INS vehicle based on a single antenna is realized by calculating the attitude angle of the vehicle and the heading angle.

A GNSS-INS vehicle attitude determination method based on a single antenna of the present invention, includes the steps as below: mounting the GNSS antenna at the centroid and in the center of the vehicle, and mounting the IMU measuring unit of the MEMS sensor on the steering shaft of the vehicle; obtaining the position and velocity information of the vehicle by means of the GNSS antenna, and obtaining the heading angular speed information of the vehicle by means of the IMU measuring unit; calculating the attitude angle of the vehicle by means of a combination of accelerometer and gyroscope; calculating the heading angle of the vehicle based on the position, velocity, and heading angular speed of the vehicle. By means of a combination of the single antenna GNSS and the IMU/MEMS sensor with a low cost, the attitude and direction are determined based on the kinematics model of the agricultural vehicle. The method combines the advantages of the short-term high precision of the IMU gyroscope and the long-term high stability of the GNSS single antenna, so as to avoid the divergence phenomenon which occurs when using gyroscope and reduce the noise level of the GNSS attitude determination. Hence, the accuracy of the attitude determination can be increased several times. An IMU sensor is used in the attitude determination method described in the present embodiment, the heading angle error is less than 0.2°, and the pitch angle error and rolling angle error are less than 0.08°. In practical applications, 3+3 six-axis integrated IMU sensor is used. The 3+3 six-axis integrated IMU sensor has a small size and light weight, and is cost-effective and modularly designed, and thus it can be integrated easily into the agricultural machinery auxiliary driving control system.

In practical applications, a tilt sensor can also be used to replace the IMU sensor to achieve the attitude determination solution. The description above is only related to the specific embodiments of the present invention, but is not intended to limit the scope of the present invention. Various modifications or replacements within the scope of the present invention, which can be easily conceived by the ordinary person skilled in the art, should fall within the scope of the present invention. Therefore, the scope of the present invention should be determined by the scope of the claims.

What is claimed is:

1. A method of determining GNSS-INS vehicle attitude based on a single antenna, wherein the method comprising:
mounting a GNSS antenna at a centroid and in a center of a vehicle, and mounting an IMU measuring unit of a MEMS sensor on a steering shaft of the vehicle;
obtaining a position and a velocity of the vehicle by means of the GNSS antenna, obtaining a heading angular speed of the vehicle by means of the IMU measuring unit;
calculating an attitude angle of the vehicle by means of a combination of an accelerometer and a gyroscope;
calculating a heading angle of the vehicle based on the position, the velocity, and the heading angular speed of the vehicle.

2. The method of determining GNSS-INS vehicle attitude based on a single antenna of claim 1, wherein when the IMU measuring unit of the MEMS sensor is fixed on the steering shaft of the vehicle, three axis coordinates of the IUM measuring unit are consistent with three axis coordinates of the vehicle.

3. The method of determining GNSS-INS vehicle attitude based on a single antenna of claim 1, wherein the step of calculating the attitude angle of the vehicle by means of the combination of the accelerometer and the gyroscope comprises:
when a condition that the vehicle is stationary or in a uniform motion, an acceleration of the vehicle is zero, and a rolling angle and a pitch angle of the vehicle are accurately obtained based on a principle of the accelerometer:

$$\theta = \sin^{-1}(a_x)$$
$$\phi = \sin^{-1}\left(\frac{a_y}{\cos\theta}\right),$$

wherein $a_x$, $a_y$ are accelerations of X axis and Y axis of a carrier coordinate system; $\theta$ is the pitch angle; and $\emptyset$ is the rolling angle;
when the vehicle is running quickly or vibrating seriously, the gyroscope is introduced to calculate the attitude angle by means of the combination of the accelerometer and the gyroscope, and the specific steps are as below:
creating a combination filter of the rolling angle and the pitch angle first, the combination filter is specifically as below:

$$\begin{cases} \dot{x}(t) = A(t)x(t) + w(t) \\ z(t) = f(x(t)) + v(t) \end{cases},$$

wherein parameters to be estimated are shown as below:

$$x(t) = [\theta \phi \omega_x \omega_y \omega_z]^T,$$

an observation vector is as below:

$$z(t) = [{}^b f_x {}^b f_y {}^b \omega_{ibx} {}^b \omega_{iby} {}^b \omega_{ibz}]^T,$$

wherein ${}^b f_{x,y}$ and ${}^b \omega_{ibx,y,z}$ are respective outputs of the accelerometer and the gyroscope;
a state transition matrix is as below:

$$A(t) = \begin{bmatrix} 0 & 0 & 0 & \cos\phi & -\sin\phi \\ 0 & 0 & 1 & \sin\phi(t)\tan\theta(t) & \cos\phi(t)\tan\theta(t) \\ 0 & 0 & 0 & 0 & 0 \\ 0 & 0 & 0 & 0 & 0 \\ 0 & 0 & 0 & 0 & 0 \end{bmatrix},$$

an observation design matrix is as below:

$$f(x(t)) = [\sin\theta \cos\phi\omega_x\omega_y\omega_z]^T,$$

calculating and obtaining the rolling angle and the pitch angle of the vehicle based on above parameters.

4. The method of determining GNSS-INS vehicle attitude based on a single antenna of claim 1, wherein the step of calculating the attitude angle of the vehicle by means of the combination of the accelerometer and the gyroscope comprises:
when the vehicle is stationary or in a uniform motion, an acceleration of the vehicle is zero, and the rolling angle and the pitch angle of the vehicle are accurately obtained based on a principle of the accelerometer:

$$\theta = \sin^{-1}(a_x)$$
$$\phi = \sin^{-1}\left(\frac{a_y}{\cos\theta}\right),$$

wherein $a_x$, $a_y$ are accelerations of X axis and Y axis of a carrier coordinate system; $\theta$ is the pitch angle; $\emptyset$ is the rolling angle;
when the vehicle is running quickly or vibrating seriously, the gyroscope is introduced to calculate the attitude angle by means of the combination of the accelerometer and the gyroscope, and the specific steps are as below:
since a tilt angle and a tilt angular velocity have a derivative relation, a real tilt angle φ of the system is used as a state vector, a constant deviation b of the gyroscope is estimated by the accelerometer, and the deviation b is used as another state vector to obtain a state equation and an observation equation:

$$\begin{bmatrix} \dot{\varphi} \\ \dot{b} \end{bmatrix} = \begin{bmatrix} 0 & -1 \\ 0 & 0 \end{bmatrix}\begin{bmatrix} \varphi \\ b \end{bmatrix} + \begin{bmatrix} 1 \\ 0 \end{bmatrix}\omega_{gyro} + \begin{bmatrix} w_g \\ 0 \end{bmatrix}$$

$$\varphi_{acce} = \begin{bmatrix} 1 & 0 \end{bmatrix}\begin{bmatrix} \varphi \\ b \end{bmatrix} + w_a$$

wherein $\omega_{gyro}$ is an angular velocity output by the gyroscope, wherein the angular velocity includes a fixed deviation, $\varphi_{acce}$ is an angle value processed by the accelerometer, $W_g$ is a noise of a measured value from the gyroscope, $W_a$ is a noise of a measured value from the accelerometer, b is a drift error of the gyroscope, $W_g$ and $W_a$ are independent from each other, and are both assumed to be white noises that satisfy a normal distribution;

setting a covariance matrix Q of a system process noise of the Kalman filter and a covariance matrix R of a measurement error, formulas of the covariance matrix Q and the covariance matrix R are as below:

$$Q = \begin{bmatrix} q\_acce & 0 \\ 0 & q\_gyro \end{bmatrix} \quad R = [r\_acce]$$

wherein q_acce and q_gyro are respective covariance of the accelerometer and the gyroscope; r_acce is a noise of a measured value from the accelerometer;

calculating and obtaining the rolling angle and the pitch angle of the vehicle based on above parameters.

5. The method of determining GNSS-INS vehicle attitude based on a single antenna according to claim 1, wherein the step of calculating the heading angle of the vehicle based on the position, the velocity, and the heading angular speed of the vehicle comprises:

obtaining the heading angle by calculating an eastward velocity and a northward velocity, a formula of obtaining the heading angle is $\psi_p = \arctan(v_E/v_N)$, wherein $\psi_p$ is the heading angle of the GNSS, $v_E$, $v_N$ are respectively the eastward velocity and the northward velocity;

when the vehicle is stationary or moves at a very low speed, the combination of a Z axis gyroscope and the GNSS are introduced to calculate the heading angle accurately, and a system equation and an observation equation are as below:

$$\begin{bmatrix} \dot{\psi}_{vel} \\ \dot{b}_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

$$\psi_{GNSS} = [1 \ 0] \begin{bmatrix} \psi_{vel} \\ g_{bias} \end{bmatrix} + v_\psi$$

wherein, $\psi_{GNSS}$ is the heading angle output by the GNSS, $b_r$ is a drift error of the gyroscope, $W_{hd}$ is a noise of a heading process, $T_b$ is first-order Markov correlation time;

formulas after linearization are as below:

$$\begin{bmatrix} \psi \\ b_r \end{bmatrix}_{k+1} = \begin{bmatrix} 1 & -T_s \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k$$

when the vehicle is moving, $H_{yaw}=[1 \ 0]$, otherwise $H_{yaw}=[0 \ 0]$.

6. The method of determining GNSS-INS vehicle attitude based on a single antenna of claim 5, wherein the MEMS sensor is a six-axis MEMS sensor.

7. The method of determining GNSS-INS vehicle attitude based on a single antenna according to claim 2, wherein the step of calculating the heading angle of the vehicle based on the position, the velocity, and the heading angular speed of the vehicle comprises:

obtaining the heading angle by calculating an eastward velocity and a northward velocity, a formula of obtaining the heading angle is $\psi_p = \arctan(v_E/v_N)$, wherein $\psi_p$ is the heading angle of the GNSS, $v_E$, $v_N$ are respectively the eastward velocity and the northward velocity;

when the vehicle is stationary or moves at a very low speed, the combination of a Z axis gyroscope and the GNSS are introduced to calculate the heading angle accurately, and a system equation and an observation equation are as below:

$$\begin{bmatrix} \dot{\psi}_{vel} \\ \dot{b}_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

$$\psi_{GNSS} = [1 \ 0] \begin{bmatrix} \psi_{vel} \\ g_{bias} \end{bmatrix} + v_\psi$$

wherein, $\psi_{GNSS}$ is the heading angle output by the GNSS, $b_r$ is a drift error of the gyroscope, $W_{hd}$ is a noise of a heading process, $T_b$ is first-order Markov correlation time;

formulas after linearization are as below:

$$\begin{bmatrix} \psi \\ b_r \end{bmatrix}_{k+1} = \begin{bmatrix} 1 & -T_s \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k$$

when the vehicle is moving, $H_{yaw}=[1 \ 0]$, otherwise $H_{yaw}=[0 \ 0]$.

8. The method of determining GNSS-INS vehicle attitude based on a single antenna according to claim 3, wherein the step of calculating the heading angle of the vehicle based on the position, the velocity, and the heading angular speed of the vehicle comprises:

obtaining the heading angle by calculating an eastward velocity and a northward velocity, a formula of obtaining the heading angle is $\psi_p = \arctan(v_E/v_N)$, wherein $\psi_p$ is the heading angle of the GNSS, $v_E$, $v_N$ are respectively the eastward velocity and the northward velocity;

when the vehicle is stationary or moves at a very low speed, the combination of a Z axis gyroscope and the GNSS are introduced to calculate the heading angle accurately, and a system equation and an observation equation are as below:

$$\begin{bmatrix} \dot{\psi}_{vel} \\ \dot{b}_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

-continued $$\psi_{GNSS} = \begin{bmatrix} 1 & 0 \end{bmatrix} \begin{bmatrix} \psi_{vel} \\ g_{bias} \end{bmatrix} + v_\psi$$

wherein, $\psi_{GNSS}$ is the heading angle output by the GNSS, $b_r$ is a drift error of the gyroscope, $W_{hd}$ is a noise of a heading process, $T_b$ is first-order Markov correlation time;

formulas after linearization are as below:

$$\begin{bmatrix} \psi \\ b_r \end{bmatrix}_{k+1} = \begin{bmatrix} 1 & -T_s \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k$$

when the vehicle is moving, $H_{yaw}=[1\ 0]$, otherwise $H_{yaw}=[0\ 0]$.

9. The method of determining GNSS-INS vehicle attitude based on a single antenna according to claim 4, wherein the step of calculating the heading angle of the vehicle based on the position, the velocity, and the heading angular speed of the vehicle comprises:

obtaining the heading angle by calculating an eastward velocity and a northward velocity, a formula of obtaining the heading angle is $\psi_p = \arctan(v_E/v_N)$, wherein $\psi_p$ is the heading angle of the GNSS, $v_E$, $v_N$ are respectively the eastward velocity and the northward velocity;

when the vehicle is stationary or moves at a very low speed, the combination of a Z axis gyroscope and the GNSS are introduced to calculate the heading angle accurately, and a system equation and an observation equation are as below:

$$\begin{bmatrix} \dot{\psi}_{vel} \\ \dot{b}_r \end{bmatrix} = \begin{bmatrix} 0 & -1 \\ 0 & -1/T_b \end{bmatrix} \begin{bmatrix} \psi_{vel} \\ b_r \end{bmatrix} + \begin{bmatrix} 1 \\ 0 \end{bmatrix} g_r + \begin{bmatrix} 1 & 0 \\ 0 & -1/T_b \end{bmatrix} w_{hd}$$

$$\psi_{GNSS} = \begin{bmatrix} 1 & 0 \end{bmatrix} \begin{bmatrix} \psi_{vel} \\ g_{bias} \end{bmatrix} + v_\psi$$

wherein, $\psi_{GNSS}$ is the heading angle output by the GNSS, $b_r$ is a drift error of the gyroscope, $W_{hd}$ is a noise of a heading process, $T_b$ is first-order Markov correlation time;

formulas after linearization are as below:

$$\begin{bmatrix} \psi \\ b_r \end{bmatrix}_{k+1} = \begin{bmatrix} 1 & -T_s \\ 0 & 1 \end{bmatrix} \begin{bmatrix} \hat{\psi} \\ \hat{b}_r \end{bmatrix}_k + \begin{bmatrix} T_s \\ 0 \end{bmatrix} [r_m]_k$$

$$[v]_k = H_{yaw} \begin{bmatrix} \hat{\psi} \\ \hat{b}_r \end{bmatrix}_k$$

when the vehicle is moving, $H_{yaw}=[1\ 0]$, otherwise $H_{yaw}=[0\ 0]$.

10. The method of determining GNSS-INS vehicle attitude based on a single antenna of claim 7, wherein the MEMS sensor is a six-axis MEMS sensor.

11. The method of determining GNSS-INS vehicle attitude based on a single antenna of claim 8, wherein the MEMS sensor is a six-axis MEMS sensor.

12. The method of determining GNSS-INS vehicle attitude based on a single antenna of claim 9, wherein the MEMS sensor is a six-axis MEMS sensor.

* * * * *